(12) United States Patent
Kruckenberg

(10) Patent No.: US 11,073,032 B2
(45) Date of Patent: Jul. 27, 2021

(54) CASCADE ARRAY VANES WITH ASSEMBLY FEATURES

(71) Applicant: Rohr, Inc., Chula Vista, CA (US)

(72) Inventor: Teresa Kruckenberg, La Mesa, CA (US)

(73) Assignee: Rohr, Inc., Chula Vista, CA (US)

( * ) Notice: Subject to any disclaimer, the term of this patent is extended or adjusted under 35 U.S.C. 154(b) by 303 days.

(21) Appl. No.: 16/045,224

(22) Filed: Jul. 25, 2018

(65) Prior Publication Data
US 2020/0032663 A1 Jan. 30, 2020

(51) Int. Cl.
*F01D 9/04* (2006.01)

(52) U.S. Cl.
CPC ........ *F01D 9/042* (2013.01); *F05D 2220/323* (2013.01); *F05D 2230/60* (2013.01); *F05D 2240/12* (2013.01)

(58) Field of Classification Search
CPC .. F01D 9/042; F05D 2230/51; F05D 2230/60; F02K 1/54; F02K 1/56; F02K 1/64; F02K 1/72
See application file for complete search history.

(56) References Cited

U.S. PATENT DOCUMENTS

| | | | | |
|---|---|---|---|---|
| 3,837,761 A * | 9/1974 | Brown | ..................... | F01D 5/22 416/191 |
| 4,278,220 A | 7/1981 | Johnston | | |
| 6,725,541 B1 | 4/2004 | Holme et al. | | |
| 8,128,354 B2 * | 3/2012 | Hansen | ................. | F04D 29/542 415/191 |
| 8,511,982 B2 * | 8/2013 | Hart | ...................... | F01D 11/006 415/209.2 |
| 9,527,238 B2 | 12/2016 | Kruckenberg | | |
| 9,803,587 B1 | 10/2017 | Schaefer et al. | | |
| 9,895,840 B2 | 2/2018 | Bartel et al. | | |
| 2001/0009642 A1 | 7/2001 | Holme | | |
| 2010/0129211 A1 * | 5/2010 | Hart | ...................... | F01D 25/246 415/209.3 |
| 2013/0266423 A1 | 10/2013 | Vauchel | | |
| 2014/0248140 A1 * | 9/2014 | Jacques | ..................... | F01D 9/02 415/183 |
| 2016/0160681 A1 | 6/2016 | Roach et al. | | |
| 2017/0057166 A1 | 3/2017 | Soria et al. | | |
| 2017/0241283 A1 * | 8/2017 | Edwards | ............... | F01D 11/005 |
| 2018/0340492 A1 * | 11/2018 | Harpal | ...................... | F02K 1/72 |
| 2019/0055900 A1 * | 2/2019 | Wadsworth | ............... | F02K 1/54 |
| 2019/0113001 A1 * | 4/2019 | Wadsworth | ............. | F01D 25/28 |
| 2019/0257268 A1 * | 8/2019 | Roach | ...................... | F02K 1/72 |

OTHER PUBLICATIONS

EP search report for EP19188450.1 dated Dec. 12, 2019.

* cited by examiner

*Primary Examiner* — Nathaniel E Wiehe
*Assistant Examiner* — Jackson N Gillenwaters
(74) *Attorney, Agent, or Firm* — Getz Balich LLC

(57) ABSTRACT

A cascade array vane is provided that includes a vane, a first longitudinal portion, a second longitudinal portion, and at least one coupling feature. The vane includes an airfoil portion extending between a first end and a second end. The first longitudinal portion is disposed at the first end of the vane extending outwardly from the vane. The second longitudinal portion is disposed at the second end of the vane extending outwardly from the vane. The at least one coupling feature is incorporated with at least one of the first longitudinal portion or the second longitudinal portion.

14 Claims, 10 Drawing Sheets

CASCADE ARRAY VANES WITH ASSEMBLY FEATURES

BACKGROUND OF THE INVENTION

1. Technical Field

The present disclosure relates to thrust reversers for aircraft propulsion systems and, more particularly, to cascades and methods for forming cascades of nacelles using thermoset components coupled together.

2. Background Information

Gas turbine engine systems for modern aircraft often include a thrust reverser incorporated into a nacelle. The thrust reverser may redirect the flow of air through the nacelle in order to apply a reverse thrust to the aircraft. One style of thrust reverser includes a translating sleeve. The translating sleeve may translate aft to deploy blocker doors into the bypass air duct of a nacelle. The blocker doors may redirect air in the bypass air duct outward though a series of cascades which then turn the air forward, producing reverse thrust. The cascades may include multiple strongbacks that extend in an axial direction and vanes coupled between the strong backs. The vanes of the cascades turn the air in the forward direction, thus providing the reverse thrust.

SUMMARY OF THE INVENTION

According to an aspect of the present disclosure a cascade array vane is provided that includes a vane, a first longitudinal portion, a second longitudinal portion, and at least one coupling feature. The vane includes an airfoil portion extending between a first end and a second end. The first longitudinal portion is disposed at the first end of the vane extending outwardly from the vane. The second longitudinal portion is disposed at the second end of the vane extending outwardly from the vane. The at least one coupling feature is incorporated with at least one of the first longitudinal portion or the second longitudinal portion.

In any of the aspects or embodiments described above and herein, each of the at least one coupling feature may be one half of a male and female pair.

In any of the aspects or embodiments described above and herein, each of the at least one coupling feature may be one half of a mating male and female pair.

In any of the aspects or embodiments described above and herein, the first longitudinal portion may include a decreased thickness segment configured for connection in a first joint, and at least one of the at least one coupling feature may be incorporated with the decreased thickness segment of the first longitudinal portion.

In any of the aspects or embodiments described above and herein, the first joint may be a shiplap joint.

In any of the aspects or embodiments described above and herein, the second longitudinal portion may include a decreased thickness segment configured for connection in a second joint, and at least one of the at least one coupling feature may be incorporated with the decreased thickness segment of the second longitudinal portion.

In any of the aspects or embodiments described above and herein, the second joint may be a shiplap joint.

According to another aspect of the present disclosure, a cascade array for a thrust reverser is provided. The cascade array includes a first vane, a second vane, and at least one mechanical coupling feature. The first vane has an airfoil portion, a first longitudinal portion, and a second longitudinal portion, and the first and second longitudinal portions of the first vane extend outwardly from the first vane airfoil portion. The second vane has an airfoil portion, a first longitudinal portion, and a second longitudinal portion, and the first and second longitudinal portions of the second vane extend outwardly from the second vane airfoil portion. The at least one mechanical coupling feature is configured to connect the first vane and second vane together.

In any of the aspects or embodiments described above and herein, the at least one mechanical coupling feature may be a male and female pair having a male protrusion and a female cavity, wherein the male protrusion is incorporated with one of the first vane or second vane, and the female cavity is incorporated with the other of the first vane or second vane.

In any of the aspects or embodiments described above and herein, the male protrusion may be incorporated with at least one of the first longitudinal portion of the first vane or the second longitudinal portion of the first vane.

In any of the aspects or embodiments described above and herein, the female cavity may be incorporated with at least one of the first longitudinal portion of the second vane or the second longitudinal portion of the second vane.

In any of the aspects or embodiments described above and herein, the male protrusion and the female cavity may be configured to mate with one another.

In any of the aspects or embodiments described above and herein, the first longitudinal portion of the first vane and the first longitudinal portion of the second vane may be configured to form a first joint, and the at least one mechanical coupling feature may be configured to connect the first vane and second vane together at the first joint between the first longitudinal portion of the first vane and the first longitudinal portion of the second vane.

In any of the aspects or embodiments described above and herein, the first joint may be a shiplap joint.

In any of the aspects or embodiments described above and herein, the second longitudinal portion of the first vane and the second longitudinal portion of the second vane may be configured to form a second joint, and the at least one mechanical coupling feature may be configured to connect the first vane and second vane together at the second joint between the second longitudinal portion of the first vane and the second longitudinal portion of the second vane.

In any of the aspects or embodiments described above and herein, the second joint may be a shiplap joint.

In any of the aspects or embodiments described above and herein, the cascade array may further includes a first strongback and a second strongback. The first vane and second vane are configured to be disposed in between the first strongback and the second strongback. At least one of the first vane or second vane includes at least one second mechanical coupling feature configured to connect the respective vane to at least one of the first strongback or the second strongback.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
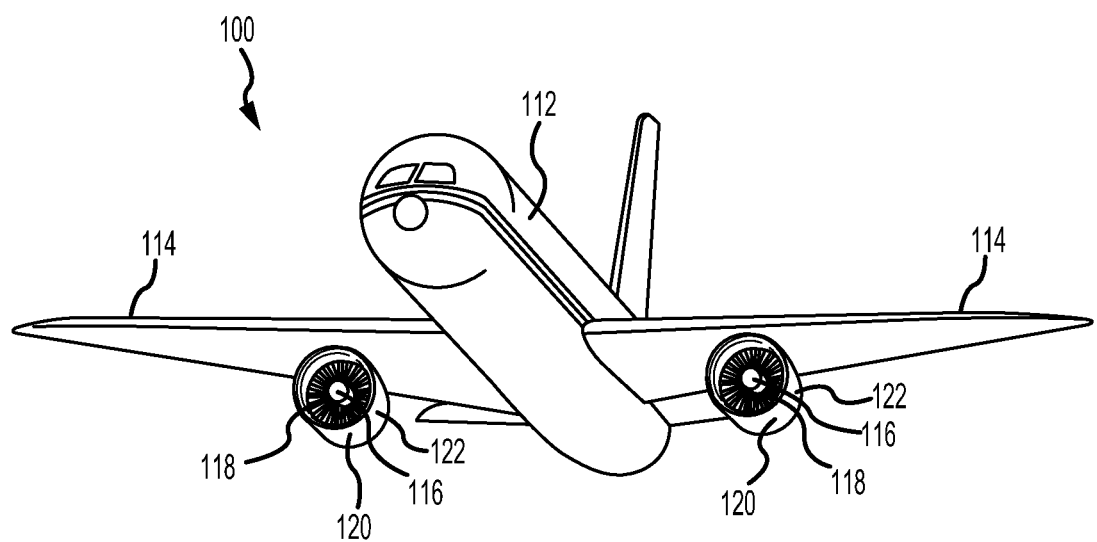
FIG. 1 illustrates a perspective view of an aircraft in accordance with various embodiments.

In various embodiments and with reference to FIG. 1, an aircraft 100 may comprise a fuselage 112 and a pair of wings 114. A propulsion system 120 (e.g., a turbofan gas turbine engine with a nacelle assembly) may be coupled to the aircraft 100 (e.g., mounted on the underside of a wing 114). The propulsion system 120 may be configured to provide at least one of forward thrust or propulsion for aircraft 100.

In various embodiments, the propulsion system 120 may comprise an engine including a fan 118 and an engine core 116, housed within a nacelle assembly 122. The typical nacelle assembly, or more simply a nacelle 122, may comprise an inlet, a fan cowl, a thrust reverser, and an exhaust system. The nacelle surrounds the engine core 116 providing smooth aerodynamic surfaces for airflow around and into the engine. The nacelle also helps define a bypass air duct through the propulsion system 120.

In various embodiments, the fan 118 may draw and direct a flow of air into and through the propulsion system 120. After the fan 118, the air is divided into two principal flow paths, one flow path through engine core 116 (i.e., a "core airflow"), and another flow path through a bypass air duct (i.e., a "bypass airflow"). The engine core flow path is directed into the engine core 116 and initially passes through a compressor that increases the air flow pressure, and then through a combustor where the air is mixed with fuel and ignited. The combustion of the fuel and air mixture causes a series of turbine blades at the rear of the engine core 116 to rotate, and to drive the engine's compressor and fan 118. The high-pressure exhaust gases from the combustion of the fuel and air mixture are thereafter directed through an exhaust system aft of the engine for thrust.

Figure 2:
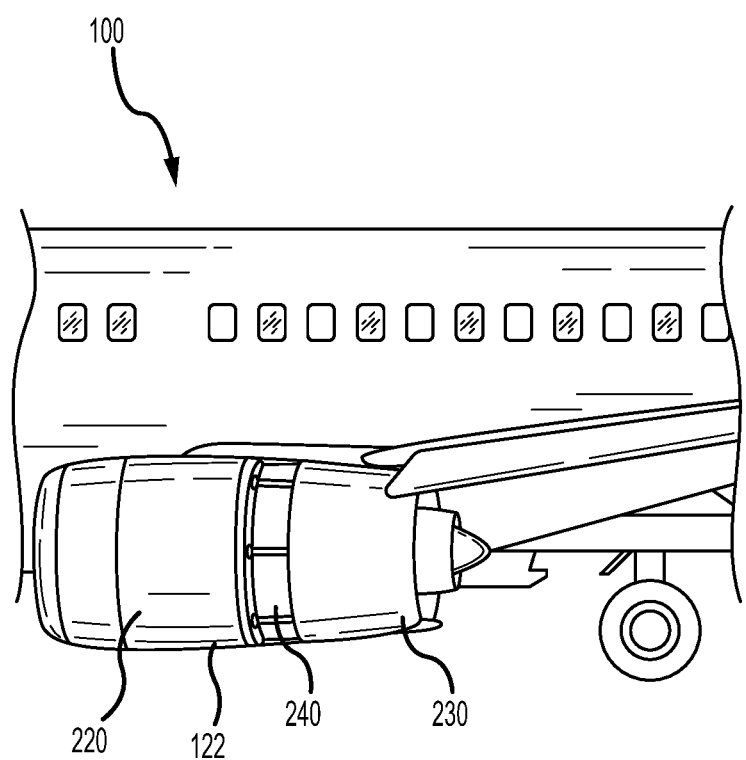
FIG. 2 illustrates a side view of the aircraft of FIG. 1 including a nacelle in accordance with various embodiments.

In various embodiments and with reference to FIG. 2, a thrust reverser system of the aircraft 100 may be included in the nacelle 122 and may include a translating sleeve 230 and a cascade, or cascade array, 240. The thrust reverser system may also comprise an air diversion system that is configured to direct airflow in the bypass duct through the cascade to create reverse thrust. The air diversion system may be any suitable system including, for example, blocker doors, diversion doors, and/or the like.

Figure 3:
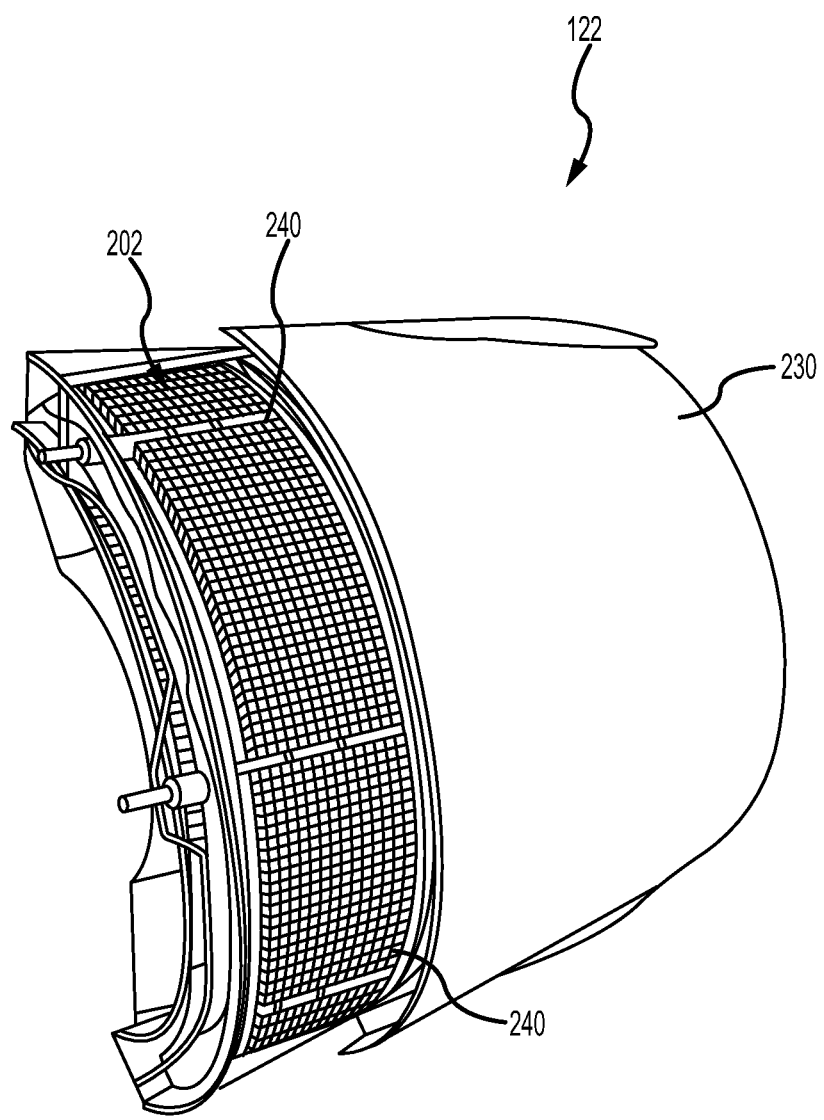
FIG. 3 illustrates a perspective view of a portion of the nacelle of FIG. 2 including a cascade array in accordance with various embodiments.

Referring to FIG. 3 and in operation, the translating sleeve 230 may translate and/or move aft, separating from a fan cowl 220 in response to an event (e.g., a landing, touch down, activation of the thrust reverser system manually or automatically, or the like). This aft movement of the translating sleeve 230 may expose the cascade 240 to allow air to be diverted through the cascade 240 and directed forward to create reverse thrust. As is known in this art, in the stowed position of the thrust reverser, the cascade 240 may be housed between an inner and an outer panel of the translating sleeve 230 which define a generally annular-shaped pocket therebetween.

Figure 4:
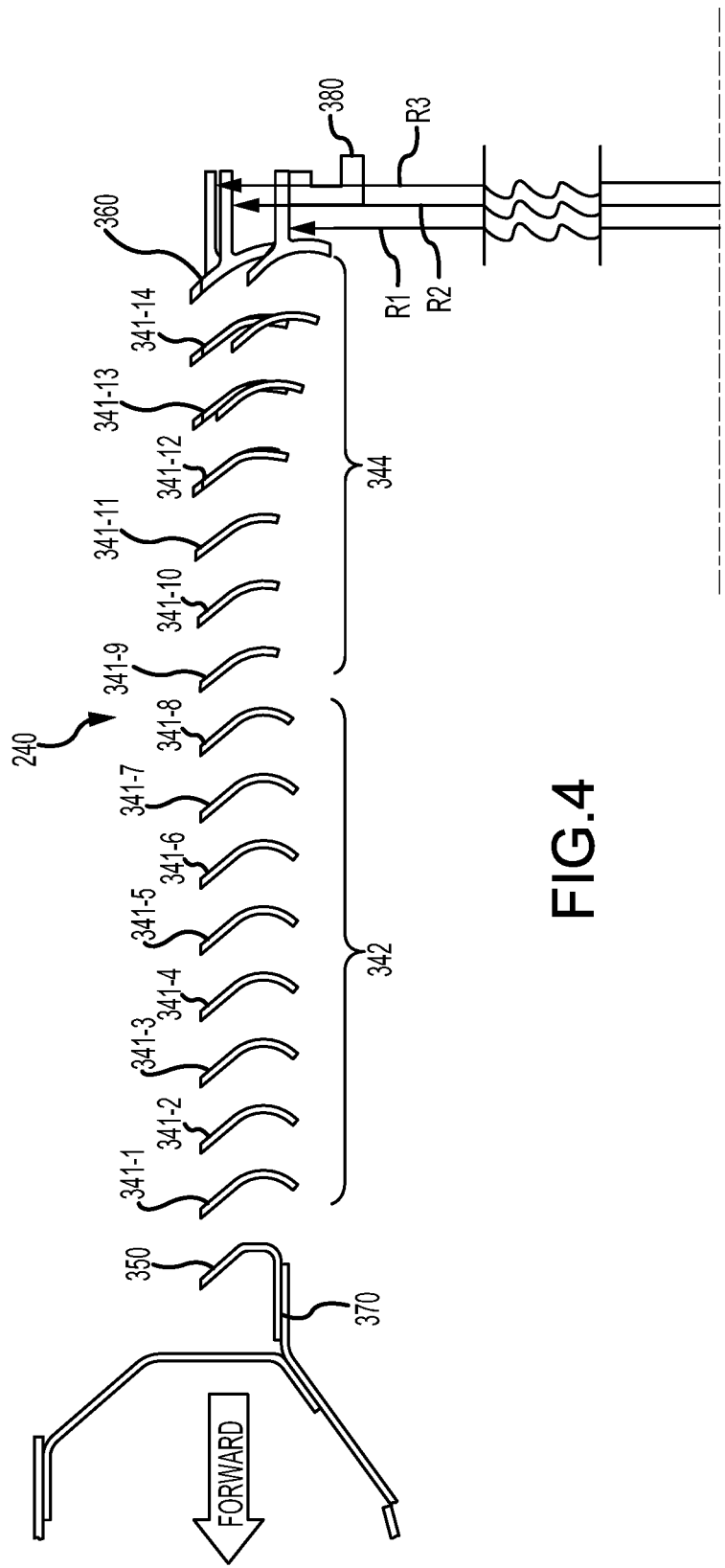
FIG. 4 illustrates a cross sectional view of the cascade array of FIG. 3 in accordance with various embodiments.

In various embodiments and with reference to FIG. 4, the cascade 240 may include a forward attachment 350 and an aft attachment 360. The cascade 240 may also include a plurality of cascade vanes 341 (shown as vane 341-1 (a forward vane or row of vanes 341-1), vane 341-2, vane 341-3, vane 341-4, vane 341-5, vane 341-6, vane 341-7, vane 341-8, vane 341-9, vane 341-10, vane 341-11, vane 341-12, vane 341-13, and vane 341-14 (an aft vane or row of vanes 341-14)). The plurality of vanes 341 may be distributed between forward attachment 350 and aft attachment 360.

In various embodiments, the forward attachment 350 may couple to and/or attach to a torque box 370. The forward attachment 350 may be coupled to the torque box 370 in any suitable fashion, including, for example, with fasteners (e.g., bolts, screws, and/or the like). The aft attachment 360 may be coupled to an aft cascade ring 380. The aft cascade ring 380 may include any suitable full or partial hoop structure configured to support the aft portion of the cascade 240 and attach to the aft attachment 360. Moreover, the aft attachment 360 may couple to the aft cascade ring 380 in any suitable fashion, including, for example, by a fastener (e.g., a nut and bolt, a screw, and/or the like).

In various embodiments and with reference to FIGS. 3 and 4, the cascade 240 may include a first vane set, or plurality of vanes, 342 near a forward portion of the cascade 240 and a second vane set, or plurality of vanes, 344 near an aft portion of the cascade 240. Each of the first vane set 342 and the second vane set 344 may be coupled between two strongbacks of a plurality of strongbacks 202. In various embodiments, the strongbacks 202 may extend the entire length (i.e., the axial length) of the cascade 240 or may only extend for a portion of the length of the cascade 240. In various embodiments, the strongbacks 202 may extend only in the forward and aft directions, and other components may be included to complete formation of a frame.

The illustration in FIG. 4 represents a composite of several diagrammatical sectional views of the cascade 240 taken at different circumferential positions. For example, the radial sectional views may be shown at about the two o'clock position, about the four o'clock position overlaid on the first view, and about the five o'clock position overlaid on the first and second views. This overlay of views illustrates the change in geometry of the cascade 240 between different circumferential positions. The forward attachment 350 may have a constant radius at all circumferential locations, in other words it may not vary and it may maintain a set radial distance from an engine centerline or nacelle centerline at generally all circumferential locations. Likewise, the first vane set 342 may include a constant radius at all circumferential positions. However, the radius of the aft attachment 360 at the aft cascade ring may vary according to the circumferential position of cascade 240. For example, at a first circumferential position, the aft attachment may couple to the aft cascade ring 380 at a first radius R1 from the engine centerline or the nacelle centerline. At a second circumferential position, the aft attachment 360 may couple to the aft cascade ring 380 at a second radius R2. At a third circumferential position, the aft attachment 360 may couple to the aft cascade ring 380 at a third radius R3. The second vane set 344 creates a transition between the constant radius vanes in the first vane set 342 and the variable radius aft attachment 360.

The varying radius of the aft attachment 360 allows the cascade 240 to fit into a confined, non-cylindrical space in the thrust reverser. If the generally annularly-shaped pocket between the inner and outer panel of the translating sleeve is not perfectly annular, but instead moves radially in and out depending upon the station (i.e. the axial position relative to the centerline) and the circumferential position, the varying radius of the aft attachment 360 allows the cascade 240 to fit in such a space. Meanwhile, the constant radius of the forward attachment 350 facilitates design and manufacture of a simpler and reliable interface between the cascade 240 and the torque box 370. However, in various embodiments, the aft attachment 360 may have a constant radius and, in various embodiments, the forward attachment 350 may have a varying radius.

Figure 5:
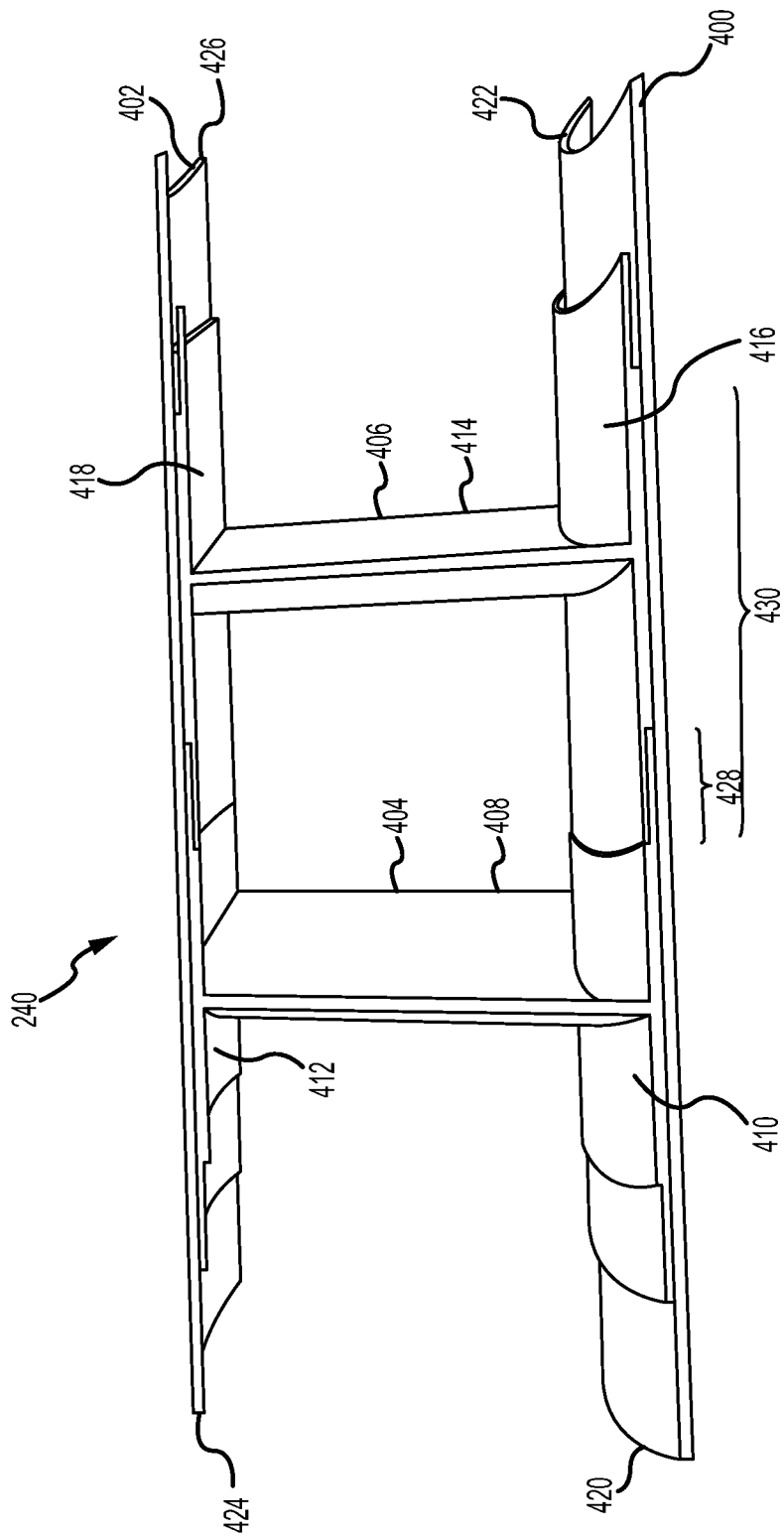
FIG. 5 illustrates a portion of the cascade array of FIG. 3 in accordance with various embodiments.

Turning now to FIG. 5, a portion of the cascade array 240 is shown. In particular, the portion of the cascade array 240 includes a first strongback 400 and a second strongback 402. Where used in this context, "a strongback" refers to a support member for supporting vanes and may include a beam, a bar, a shaft, a post, or the like.

The portion of the cascade array 240 further includes a first vane 404 and a second vane 406. The first vane 404 may include a first airfoil portion 408, a first vane first longitudinal portion 410, and a first vane second longitudinal portion 412. The first vane first longitudinal portion 410 extends in two directions away from the first airfoil portion 408 (e.g., the first vane first longitudinal portion 410 may extend at least one of forward or aft relative to the first airfoil portion 408). The first vane first longitudinal portion 410 is designed to be attached to the first strongback 400. The first vane second longitudinal portion 412 may extend in two directions away from the first airfoil portion 408 and is designed to be attached to the second strongback 402.

The second vane 406 includes a second airfoil portion 414, a second vane first longitudinal portion 416, and a second vane second longitudinal portion 418. The second vane first longitudinal portion 416 and the second vane second longitudinal portion 418 may each extend in two directions away from the second airfoil portion 414 and are designed to be attached to the first strongback 400 and the second strongback 402, respectively.

In various embodiments, the first vane first longitudinal portion 410 and the second vane first longitudinal portion 416 are designed to at least partially overlap. In that regard, in a region 428, the first vane first longitudinal portion 410 may be directly coupled to the first strongback 400 and the second vane first longitudinal portion 416 may be directly coupled to the first vane first longitudinal portion 410 such that the first vane first longitudinal portion 410 is sandwiched between the first strongback 400 and the second vane first longitudinal portion 416. In various embodiments, the first vane first longitudinal portion 410 may overlap with the second vane first longitudinal portion 416 in a relatively large region, as shown by element 430. Such extended overlap may provide additional structural support for the cascade array 240.

In various embodiments, the second vane first longitudinal portion 416 may instead be sandwiched between the first vane first longitudinal portion and the first strongback 400. In a similar manner, the first vane second longitudinal portion 412 may at least partially overlap with the second vane second longitudinal portion 418. Such overlap of the first vane first longitudinal portion 410 and the second vane first longitudinal portion 416 may provide increased structural strength of the cascade array 240. Such overlap of longitudinal portions may not exist in various embodiments.

Figure 10:
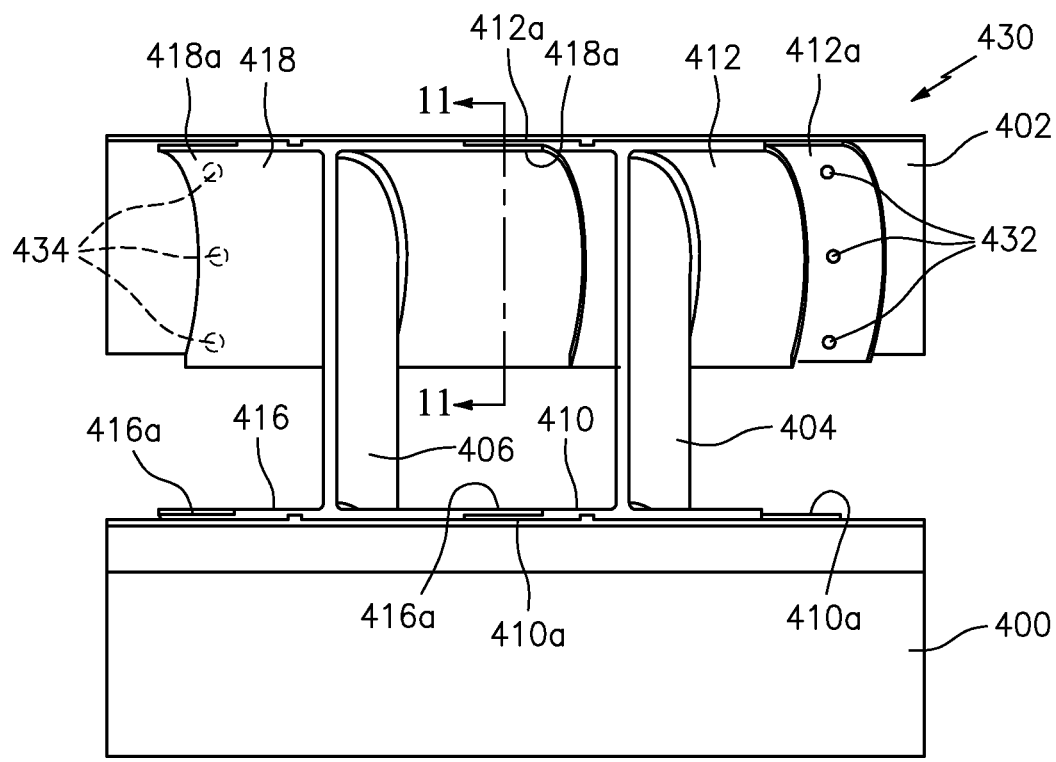
FIG. 10 illustrates a portion of a cascade array in accordance with various embodiments.
Figure 11:
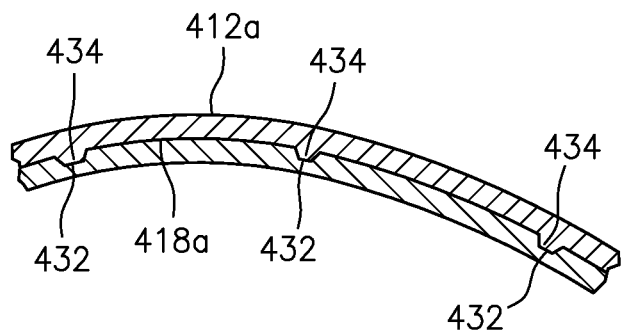
FIG. 11 is a diagrammatic illustration of vane elements along section 11-11 shown in FIG. 10

In some embodiments, a first vane 404 and a second vane may be connected to one another by a mechanical connection; e.g., as a part of assembly, to facilitate assembly. For example as shown in FIGS. 10 and 11, coupling features 430 may be used to couple adjacent vanes 404, 406 together during assembly of a vane cascade array. The coupling features 430 are configured to connect and hold the adjacent vanes 404, 406 together. A non-limiting example of a pair of coupling features 430 is a male and female pair; e.g., where the male portion is received within the female portion. In FIGS. 10 and 11, a male protrusion 432 (e.g., a dimple, a pin, a rib, a groove, etc.) is received within a female cavity 434 (e.g., a depression, an aperture, a channel, a groove, etc.) configured to receive the male protrusion 432. The male protrusion 432 and the female cavity 434 may have mating geometries, but the present disclosure is not limited to mating pairs; e.g., any pair of coupling features 430 that is operable to mechanically connect the adjacent vanes 404, 406 is acceptable. A mating male/female pair may provide the benefit of more securely coupling the adjacent vanes 404, 406, however.

In the example shown in FIGS. 10 and 11 (also shown in FIG. 5), the first vane 404 includes a first vane first longitudinal portion 410 and a first vane second longitudinal portion 412, and the second vane 406 includes a second vane first longitudinal portion 416 and a second vane second longitudinal portion 418. As described above, the longitudinal portions of the respective vanes 404, 406 may each have a segment that overlaps with the segment of the other. More specifically, each longitudinal portion 410, 412, 416, 418 includes a stepped segment 410a, 412a, 416a, 418a that has a decreased thickness relative to the remainder of that longitudinal portion. When assembled, the stepped segments 410a, 412a, 416a, 418a overlap one another. This type of joint is sometimes referred to as a "shiplap" joint. In this exemplary embodiment shown in FIGS. 10 and 11, the male protrusion 432 is a rounded dimple that extends outwardly and the female cavity 434 is a semi-spherical shaped cavity that mates with the male protrusion 432. As stated above, the coupling features 430 are not limited to male and female pairs, and therefore not limited to mating male and female pairs. The location of the coupling features 430 that couple adjacent vanes may be located anywhere. Positioning the coupling pairs relative to the stepped segments 410a, 412a, 416a, 418a of the respective longitudinal portions provides the benefit of ease of manufacturing and assembly. The aforesaid stepped segments 410a, 412a, 416a, 418a are relatively thin and are therefore elastically deformable. The elastic deformability of the stepped segments 410a, 412a, 416a, 418a facilitates manufacturing in that a male or female element can be readily elastically displaced from a mold, and facilitates assembly because the stepped segments to be coupled (i.e., overlapped) can be elastically displaced until aligned and coupled. The present disclosure is not limited to shiplap type joints as a means for connecting/interfacing adjacent vanes 404, 406, and/or connecting/interfacing a vane 404, 406 with a strongback 400, 402. Another example of a connection/interface between adjacent vanes 404, 406 (and/or with strongbacks 400, 402) is a tongue and groove type joint.

In some embodiments, a vane may include a vane 404, 406 and a strongback 400, 402 may be connected to one another by a mechanical connection; e.g., as a part of assembly, to facilitate assembly. The mechanical connection (e.g., a pair of coupling features such as a male and female pair) is configured to connect and hold a vane relative to one or both strongbacks 400, 402. This element may be combined with the above described coupling features between adjacent vanes 404, 406.

The first strongback 400 may have a first strongback first end 420 and a first strongback second end 422. Likewise, the second strongback 402 may have a second strongback first end 424 and a second strongback second end 426. Referring to FIGS. 4 and 5, the first ends 420, 424 may be designed to be coupled to, or located proximate to, the torque box 370. The second ends 422, 426 may be designed to be coupled to, or located proximate to, the aft cascade ring 380.

The cascade array 240 may provide advantages relative to conventional cascade arrays. For example, the cascade array 240 may include a composite material and may thus be relatively strong and lightweight. Each of the vanes 404, 406 and the strongbacks 400, 402 may be formed separately and then coupled together, providing for a relatively easy and inexpensive assembly. For example, the vanes 404, 406 and strongback 400, 402 may be formed using any known techniques such as injection molding, compression molding, impression molding, additive manufacturing, or the like. Because each of these components is formed separately, manufacturing costs may be decreased relative to conventional methods of manufacturing a cascade array. After the separate components are formed, they may be coupled together using any technique.

Figure 6A:
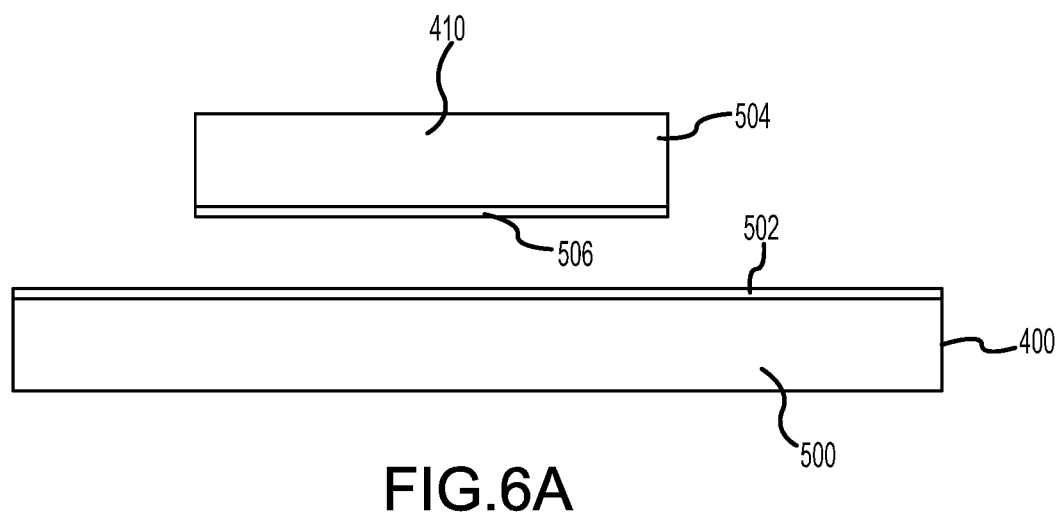
FIG. 6A illustrates use of a thermoplastic to weld together a strongback and a vane of a cascade array in accordance with various embodiments.

For example and referring to FIG. 6A, the first strongback 400 may include a first thermoset composite material, along with a first thermoplastic coating 502 applied to the surface of the first strongback 400 that is to be coupled to the first vane first longitudinal portion 410. Likewise, the first vane first longitudinal portion 410 may include a second thermoset composite material 504 along with a second thermoplastic coating 506 applied to the surface of the first vane first longitudinal portion 410 that is to be coupled to the first strongback 400.

The first thermoset composite material 500 may be the same as, or different than, the second thermoset composite material 504. For example, the thermoset composite materials 500, 504 may include a prepreg, such as a mixture of fibers and a resin. As a more specific example, the thermoset composite materials 500, 504 may include RMS 526 carbon epoxy prepreg, or long fiber chopped carbon epoxy molding compound.

The thermoplastic coatings 502, 506 may include a film that is placed on the thermoset composite materials 500, 504, a liquid that is coated or sprayed onto the thermoset composite materials 500, 504, a solid that is deposited onto the thermoset composite materials 500, 504, or the like. For example, the thermoplastic coatings 502, 506 may include polyvinylidene fluoride (PVDF), nylon, polyether ether ketone (PEEK), or the like. In various embodiments, the thermoplastic coatings 502, 506 may further include fibers, such as glass fiber, carbon fiber, metal fiber, aramid fiber, or the like.

The thermoplastic coatings 502, 506 may diffuse into the epoxy of the thermoset composite materials 500, 504 thus creating a mechanical bond with the thermoset composite materials 500, 504 in response to being molded together, or it may be overmolded onto the thermoset composite materials. In that regard, the first strongback 400 may be coupled to the first vane first longitudinal portion 410 by heating the thermoplastic coatings 502, 506 causing them to form a bond with the thermoset composite materials 500, 504. This welding may be performed in any of a number of manners such as ultrasonic welding, induction welding, resistance welding, thermal welding, or the like.

The material of the thermoplastic coatings 502, 506 may be selected based on which type of weld will be performed. For example, if resistance welding will be used to weld the thermoplastic coating 502 to the thermoplastic coating 506, then the thermoplastic coatings 502, 506 may include metal fibers or particles to allow current to flow through the thermoplastic coatings 502, 506.

In various embodiments, the vanes 404, 406 may be cured prior to assembly with the strongbacks 400, 402. In that regard, the vanes 404, 406 may operate as tooling blocks during the weld process.

In various embodiments, the vanes 404, 406 may be coupled to the strongbacks 400, 402 one row at a time. In those embodiments wherein the vanes 404, 406 have coupling features 430, the vanes 404, 406 may be coupled together prior to coupling with the strongbacks 400, 402, or a vane 404, 406 may be inserted between a pair of strongbacks 400, 402, and then a second vane 406, 404 may be inserted and coupled to the first vane, etc., as a part of the vane/strongback assembly. In those embodiments wherein a vane 404, 406 and the strongbacks 400, 402 have coupling features 430, the vanes and strongbacks can be coupled. In both of these embodiments, the mechanical connection provided by the coupling features can facilitate assembly; e.g., by positionally maintaining the respective elements.

Once the vanes 404, 406 are relatively positioned (and mechanically connected in some instances) to the strongbacks 400, 402, the welding process may begin at the forward end of the cascade array 240 or the aft end of the cascade array 240 and each row of vanes may be welded following such progression. For example, welding may begin at the forward row of vanes, then the next row of vanes may be welded, and so forth until the aft most row of vanes is welded to the strongbacks 400, 402.

Figure 6B:
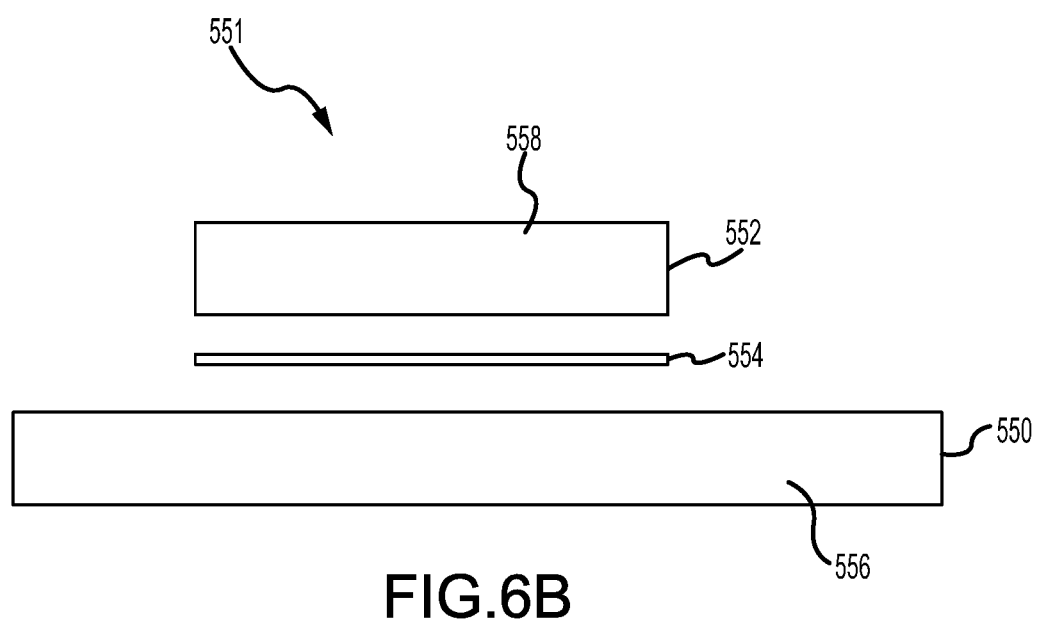
FIG. 6B illustrates use of an adhesive to couple together a strongback and a vane of a cascade array in accordance with various embodiments.

Referring now to FIG. 6B, components of a cascade array 551 may be coupled together using an adhesive 554. For example, a first strongback 550 may include a first thermoset (or thermoplastic) compound material 556, and a first vane first longitudinal portion 552 may include a second thermoset (or thermoplastic) composite material 558. The cascade array 551 may further include the adhesive 554. The adhesive 554 may be placed between the first strongback 550 and the first vane first longitudinal portion 552 in order to couple these components together. The adhesive 554 may include any adhesive such as glue, epoxy, rubber, resin, or the like.

Figure 7:
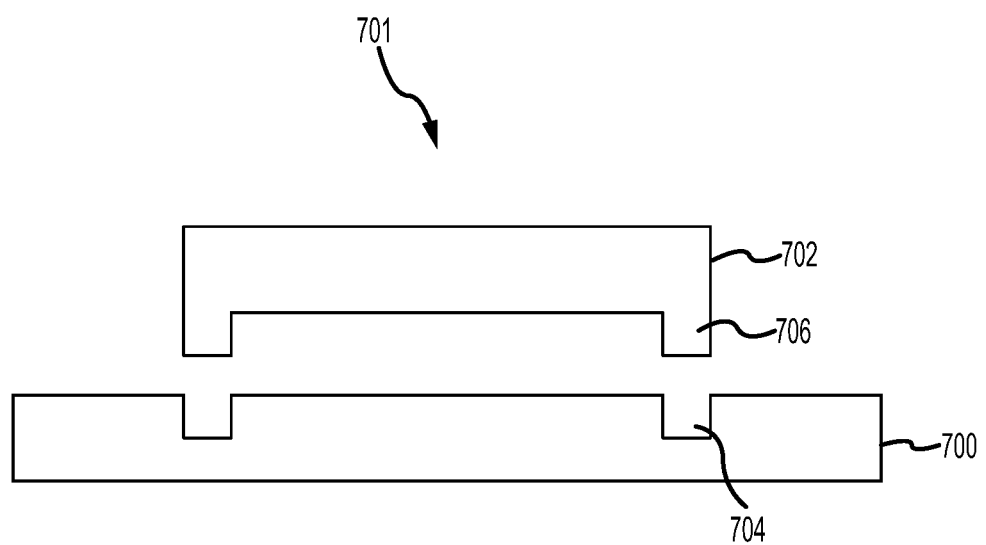
FIG. 7 illustrates use of features included in a strongback and in a vane to facilitate alignment of the vane relative to the strongback in accordance with various embodiments.

Referring now to FIG. 7, another cascade array 701 may include a plurality of strongbacks and a plurality of vanes. The portion of the cascade array 701 shown in FIG. 7 includes a first strongback 700 and a first vane first longitudinal portion 702. The components (i.e., first strongback 700 and the first vane first longitudinal portion 702) may include features that facilitate alignment of the vanes with the strongbacks. In particular, the first strongback 700 defines a plurality of slots 704, and the first vane first longitudinal portion 702 includes or defines a plurality of protrusions 706 that are designed to mate with the slots 704 of the first strongback 700. In that regard, the first vane first longitudinal portion 702 may be properly aligned with first strongback 700 in response to the protrusions 706 being received by the slots 704. In various embodiments, thermoplastic coatings and/or adhesives may be used in addition with the slots 704 and protrusions 706 to couple the components together. In various embodiments, slots and protrusions or other mating features may be defined by or included in thermoplastic coatings. In various embodiments, such mating features may include dovetails, tenon and mortise, or the like.

Figure 8:
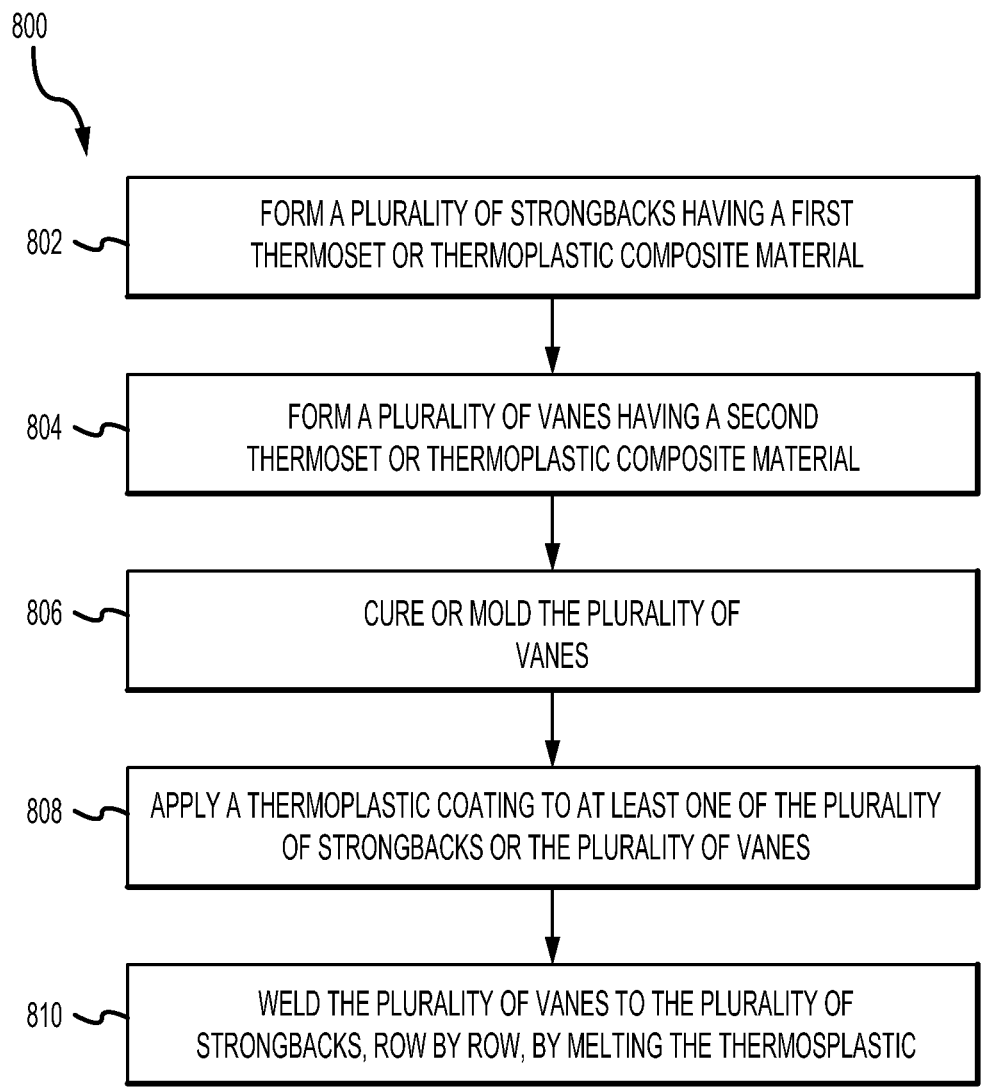
FIG. 8 illustrates a method of forming a cascade array using a thermoplastic to couple strongbacks to vanes in accordance with various embodiments.

Turning to FIG. 8, a method 800 for forming a cascade array for use in a nacelle of an aircraft is shown. In block 802, a plurality of strongbacks may be formed. The strongbacks may be formed from a first thermoset or thermoplastic composite material which may include any thermoset or thermoplastic composite material.

In block 804, a plurality of vanes may be formed. The vanes may be formed from a second thermoset or thermoplastic composite material which may include any thermoset or thermoplastic composite material and may be the same as, or different than, the thermoset or thermoplastic composite material of the strongbacks of block 802. For example, the strongbacks of block 802 may include thermoset and the vanes of block 804 may include a thermoplastic, or the like. The strongbacks and the vanes may be formed using any known method such as molding, additive manufacturing, or the like.

In block 806, the plurality of vanes may be cured or molded. Such curing or molding completes formation of the vanes, allowing the vanes to operate as tooling blocks while other connections, such as between vanes and strongbacks, are being formed. In various embodiments, the strongbacks may also be cured or molded at this point in time.

In block 808, a thermoplastic coating may be applied to a surface of the strongbacks and/or a surface of the vanes. In various embodiments, the thermoplastic coating may be applied to all of the strongbacks, none of the strongbacks, or some of the strongbacks, and, in various embodiments, the thermoplastic coating may be applied to all of the vanes, none of the vanes, or some of the vanes. In various embodiments, the thermoplastic may be cured in block 806 with the thermoset or applied secondarily to the thermoset or thermoplastic strongbacks and/or vanes.

In block 810, the plurality of vanes may be welded to the plurality of strongbacks. In some embodiments, such welding may occur one row at a time such that a forward row of vanes is first welded to the strongbacks, then the next row in the aft direction is welded to the strongbacks, and so forth until the aft-most row of vanes is welded to the strongbacks. In some embodiments, the welding may occur one row at a time but from an aft end of the cascade array such an aft-most row is welded first, then the next row forward, and so forth.

Figure 9:
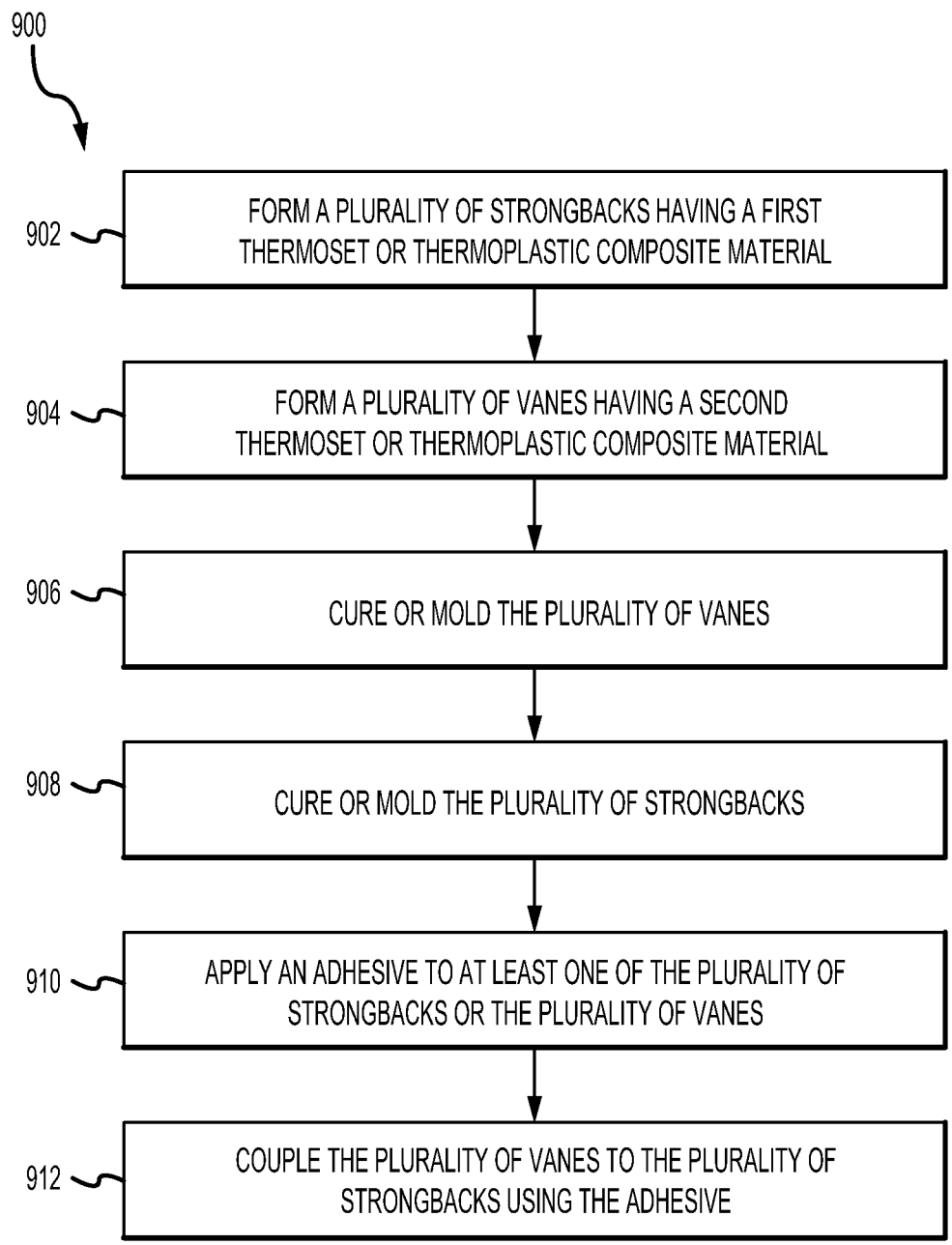
FIG. 9 illustrates a method of forming a cascade array using an adhesive to couple strongbacks to vanes in accordance with various embodiments.

Referring now to FIG. 9, another method 900 forming a cascade array for use with a nacelle of an aircraft is shown. In block 902, a plurality of strongbacks may be formed. The strongbacks may be formed with any material, such as a thermoset or thermoplastic composite material.

In block 904, a plurality of vanes may be formed. The vanes may be formed using any material such as a thermoset or thermoplastic composite material. In various embodiments, the material of the vanes may be the same as, or different than, the material of the strongbacks.

In block 906, the plurality of vanes may be cured or molded. In block 908, the plurality of strongbacks may be cured or molded.

In block 910, an adhesive may be applied to one or more strongback and one or more vane. In various embodiments, the adhesive may be applied to, or positioned between, each mating interface between the plurality of strongbacks and the plurality of vanes.

In block 912, the plurality of vanes may be coupled to the plurality of strongbacks using the adhesive. For example, the adhesive may be cured to cause the vanes to be coupled to the strongbacks.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A cascade array for a thrust reverser, comprising:
   a first vane having an airfoil portion, a first longitudinal portion, and a second longitudinal portion, the airfoil portion of the first vane extending laterally between the first and second longitudinal portions of the first vane, and the first and second longitudinal portions of the first vane extending longitudinally outwardly from the airfoil portion of the first vane;
   a second vane having an airfoil portion, a first longitudinal portion, and a second longitudinal portion, the airfoil portion of the second vane extending laterally between the first and second longitudinal portions of the second vane, and the first and second longitudinal portions of the second vane extending outwardly from the airfoil portion of the second vane; and
   at least one mechanical coupling feature configured to connect the first vane and second vane together, the at least one mechanical coupling feature comprising a male and female pair having a male protrusion and a female cavity, the male protrusion formed integrally with the first vane, and the female cavity incorporated with the second vane;
   wherein the male protrusion projects laterally into the female cavity.

2. The array of claim 1, wherein the male protrusion is incorporated with one of the first longitudinal portion of the first vane or the second longitudinal portion of the first vane.

3. The array of claim 2, wherein the female cavity is incorporated with one of the first longitudinal portion of the second vane or the second longitudinal portion of the second vane.

4. The array of claim 3, wherein the male protrusion and the female cavity are configured to mate with one another.

5. The array of claim 1, wherein the first longitudinal portion of the first vane and the first longitudinal portion of the second vane are configured to form a first joint, and the at least one mechanical coupling feature is configured to connect the first vane and second vane together at the first joint between the first longitudinal portion of the first vane and the first longitudinal portion of the second vane.

6. The array of claim 5, wherein the first joint is a shiplap joint.

7. The array of claim 5, wherein the second longitudinal portion of the first vane and the second longitudinal portion of the second vane are configured to form a second joint, and the at least one mechanical coupling feature is configured to connect the first vane and second vane together at the second joint between the second longitudinal portion of the first vane and the second longitudinal portion of the second vane.

8. The array of claim 7, wherein the second joint is a shiplap joint.

9. The array of claim 1, further comprising:
   a first strongback; and
   a second strongback;
   wherein the first vane and second vane are configured to be disposed in between the first strongback and the second strongback; and
   wherein at least one of the first vane or second vane includes at least one second mechanical coupling feature configured to connect the respective vane to at least one of the first strongback or the second strongback.

10. The cascade array of claim 1, wherein the male protrusion comprises a dimple, a pin or a rib.

11. The cascade array of claim 1, wherein the female cavity comprises a groove or a channel.

12. A cascade array vane, comprising:
   a vane having an airfoil portion extending laterally between a first end and a second end;
   a first longitudinal portion disposed at the first end of the vane and extending longitudinally outwardly from the vane;
   a second longitudinal portion disposed at the second end of the vane and extending longitudinally outwardly from the vane; and
   a coupling feature incorporated with the first longitudinal portion, the coupling feature comprising one half of a male and female pair, and the one half of the male and female pair comprising a protrusion that projects laterally outward from a surface of the first longitudinal portion, wherein the protrusion is formed integrally with the first longitudinal portion.

13. The cascade array vane of claim 12, wherein the protrusion comprises a dimple, a pin or a rib.

14. The cascade array vane of claim 12, wherein at least the vane, the first longitudinal portion, the second longitudinal portion and the protrusion are formed together as a monolithic body.

* * * * *